(12) United States Patent
Hioda et al.

(10) Patent No.: US 10,532,716 B2
(45) Date of Patent: Jan. 14, 2020

(54) VEHICLE CURTAIN AIRBAG DEVICE

(71) Applicant: TOYOTA JIDOSHA KABUSHIKI KAISHA, Toyota-shi, Aichi-ken (JP)

(72) Inventors: Seiji Hioda, Chiryu (JP); Koji Ohara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 110 days.

(21) Appl. No.: 15/712,875

(22) Filed: Sep. 22, 2017

(65) Prior Publication Data

US 2018/0099635 A1    Apr. 12, 2018

(30) Foreign Application Priority Data

Oct. 7, 2016  (JP) ................. 2016-199320

(51) Int. Cl.
*B60R 21/232* (2011.01)
*B60R 21/2338* (2011.01)
*B60R 21/231* (2011.01)
*B60R 21/00* (2006.01)

(52) U.S. Cl.
CPC ........ *B60R 21/232* (2013.01); *B60R 21/2338* (2013.01); *B60R 21/23138* (2013.01); *B60R 2021/0048* (2013.01); *B60R 2021/23153* (2013.01)

(58) Field of Classification Search
CPC .............. B60R 21/232; B60R 21/2338; B60R 21/23138; B60R 2021/23386; B60R 2021/23153; B60R 2021/0048; B60R 21/231; B60R 21/233
See application file for complete search history.

(56) References Cited

U.S. PATENT DOCUMENTS

| | | | | |
|---|---|---|---|---|
| 3,510,150 A | * | 5/1970 | Wilfert ............... | B60R 21/16 280/730.1 |
| 6,123,355 A | * | 9/2000 | Sutherland ......... | B60R 21/231 280/728.2 |
| 8,528,933 B1 | * | 9/2013 | Arellano ............ | B60R 21/231 280/730.2 |
| 9,505,373 B2 | * | 11/2016 | Moon ................. | B60R 21/232 |
| 9,776,593 B2 | * | 10/2017 | Je ..................... | B60R 21/232 |
| 9,969,346 B2 | * | 5/2018 | Patel ................. | B60R 21/233 |
| 10,017,146 B2 | * | 7/2018 | Sugimori .......... | B60R 21/232 |

(Continued)

FOREIGN PATENT DOCUMENTS

DE     102004032668 A1 * 2/2005 .......... B60R 21/213
JP       2000-6750 A       1/2000
(Continued)

OTHER PUBLICATIONS

Mori et al. DE 10 2004 032668 B4, Machine English Translation, ip.com (Year: 2013).*

*Primary Examiner* — Karen Beck
(74) *Attorney, Agent, or Firm* — Oliff PLC

(57) ABSTRACT

There is provided a vehicle curtain airbag device including: a rear seat chamber configured to inflate and deploy between the head of a rear seat occupant and a vehicle cabin side section, the rear seat chamber including a restraint face that opposes the head in a vehicle width direction and is angled or curved toward a vehicle width direction outer side, on progression toward a vehicle front side, in a fully inflated and deployed state.

7 Claims, 14 Drawing Sheets

(56) References Cited

U.S. PATENT DOCUMENTS

| | | | |
|---|---|---|---|
| 10,081,328 B2* | 9/2018 | Choi | B60R 21/214 |
| 2004/0066022 A1* | 4/2004 | Mori | B60N 2/42745 |
| | | | 280/730.1 |
| 2005/0116451 A1* | 6/2005 | Kino | B60R 21/232 |
| | | | 280/730.2 |
| 2006/0097492 A1* | 5/2006 | Bakhsh | B60R 21/232 |
| | | | 280/730.2 |
| 2006/0131847 A1* | 6/2006 | Sato | B60R 21/207 |
| | | | 280/730.2 |
| 2008/0290634 A1 | 11/2008 | Sugimori et al. | |
| 2010/0140909 A1* | 6/2010 | Jang | B60R 21/231 |
| | | | 280/743.1 |
| 2011/0049852 A1* | 3/2011 | Kibat | B60R 21/23138 |
| | | | 280/743.2 |
| 2011/0079990 A1* | 4/2011 | Cheal | B60R 21/213 |
| | | | 280/730.2 |
| 2014/0035265 A1* | 2/2014 | Nakashima | B60R 21/232 |
| | | | 280/730.2 |
| 2014/0217707 A1* | 8/2014 | Konishi | B60R 21/213 |
| | | | 280/728.2 |
| 2014/0239620 A1* | 8/2014 | Kawamura | B60R 21/213 |
| | | | 280/730.2 |
| 2014/0239621 A1* | 8/2014 | Kawamura | B60R 21/213 |
| | | | 280/730.2 |
| 2014/0265271 A1* | 9/2014 | Dinsdale | B60R 21/23138 |
| | | | 280/730.2 |
| 2015/0054262 A1* | 2/2015 | Kwon | B60R 21/2338 |
| | | | 280/728.2 |
| 2015/0307057 A1* | 10/2015 | Moon | B60R 21/232 |
| | | | 280/728.2 |
| 2015/0367803 A1* | 12/2015 | Fujiwara | B60R 21/207 |
| | | | 280/728.2 |
| 2016/0059816 A1* | 3/2016 | Je | B60R 21/232 |
| | | | 280/730.2 |
| 2016/0107599 A1* | 4/2016 | Lee | B60R 21/232 |
| | | | 280/730.2 |
| 2016/0368448 A1* | 12/2016 | Yoshida | B60R 21/232 |
| 2017/0166158 A1* | 6/2017 | Oh | B60R 21/23138 |
| 2017/0182966 A1* | 6/2017 | Choi | B60R 21/232 |
| 2018/0056917 A1* | 3/2018 | Patel | B60R 21/233 |
| 2018/0072256 A1* | 3/2018 | Hioda | B60R 21/213 |
| 2018/0099634 A1* | 4/2018 | Ohno | B60R 21/213 |
| 2018/0126944 A1* | 5/2018 | Choi | B60R 21/214 |
| 2018/0257600 A1* | 9/2018 | Sugimori | B60R 21/232 |
| 2018/0281741 A1* | 10/2018 | Nagasawa | B60R 21/23138 |
| 2018/0297549 A1* | 10/2018 | Kobayashi | B60R 21/207 |
| 2018/0354448 A1* | 12/2018 | Moon | B60R 21/233 |
| 2019/0135218 A1* | 5/2019 | Takahashi | B60R 21/207 |
| 2019/0161051 A1* | 5/2019 | Gwon | B60R 21/232 |

FOREIGN PATENT DOCUMENTS

| | | | | |
|---|---|---|---|---|
| JP | 2006-008105 A | | 1/2006 | |
| JP | 2006-096288 A | | 4/2006 | |
| JP | 2008-290606 A | | 12/2008 | |
| JP | 2012-096780 A | | 5/2012 | |
| JP | 2018058553 A | * | 4/2018 | |
| JP | 2018058560 A | * | 4/2018 | B60R 21/213 |
| JP | 2018094927 A | * | 6/2018 | |
| JP | 6460070 B2 | * | 1/2019 | B60R 21/213 |
| WO | 2010/089847 A1 | | 8/2010 | |
| WO | 2012/144404 A1 | | 10/2012 | |

* cited by examiner

VEHICLE CURTAIN AIRBAG DEVICE

CROSS-REFERENCE TO RELATED APPLICATION

This application is based on and claims priority under 35 USC 119 from Japanese Patent Application No. 2016-199320 filed on Oct. 7, 2016, the disclosure of which is incorporated by reference herein.

BACKGROUND

Technical Field

The present disclosure relates to a vehicle curtain airbag device.

Related Art

The occupant head protecting airbag device described in International Publication (WO) No. 2010/089847 is configured such that a rear seat inflation portion (rear seat chamber) of a curtain airbag inflates and deploys between the head of a rear seat occupant and a vehicle body side section.

With the curtain airbag device configured as above, in a side collision of a vehicle, the head of a rear seat occupant moves toward a vehicle width direction outer side under inertia, plunges into the rear seat chamber of the curtain airbag, and rebounds toward a vehicle width direction center side in reaction thereto. The vehicle width direction inflation width of a rear seat chamber such as that described above is generally set so as to be largest directly to the side of the center of gravity of the head of a rear seat occupant or more to the vehicle front side of the center of gravity than directly to the side. Thus, the rebound direction of a head rebounding off the rear seat chamber may be angled in a direction toward the vehicle rear side with respect to the vehicle width direction depending on the location where the head of a rear seat occupant strikes the rear seat chamber.

As a result, a head that has rebounded is liable to make contact with the seatback of the rear seat. Frictional force from the seatback causes the head to rotate about the neck axis at the time of such contact, thereby causing rotational head injury (Brain Rotational Injury Criterion, known as BrIC).

SUMMARY

In consideration of the above circumstances, the present disclosure provides a vehicle curtain airbag device capable of preventing or effectively suppressing rotational head injury to a rear seat occupant in a side collision.

A vehicle curtain airbag device according to a first aspect of the present disclosure includes a rear seat chamber configured to inflate and deploy between the head of a rear seat occupant and a vehicle cabin side section. The rear seat chamber includes a restraint face that opposes the head in a vehicle width direction and is angled or curved toward a vehicle width direction outer side on progression toward a vehicle front side in a fully inflated and deployed state.

In the first aspect of the present disclosure, in cases in which, for example, a side collision of a vehicle has been detected or predicted, the rear seat chamber inflates and deploys between the head of a rear seat occupant (sometimes simply referred to as "head" hereafter) and the vehicle cabin side section. The restraint face of the rear seat chamber, which opposes the head in the vehicle width direction, is angled or curved toward the vehicle width direction outer side on progression toward the vehicle front side in the fully inflated and deployed state. Thus, the rebound direction of a rebounding head that has plunged into the restraint face is more easily angled toward the vehicle front side with respect to the vehicle width direction. As a result, a rebounding head is less likely to make contact with a seatback or a headrest of a rear seat (in particular, is less likely to contact the headrest). Moreover, even if the head were to make contact with the seatback of the rear seat, the timing of contact would be delayed and the speed of the head would be reduced, thereby reducing the rotational force acting on the head at the time of contact. The present disclosure thereby enables rotational head injury of a rear seat occupant in a side collision to be prevented or effectively suppressed.

A vehicle curtain airbag device according to a second aspect of the present disclosure is the first aspect, wherein the rear seat chamber is formed in a shape in which a vehicle width direction inflation width at a location to the vehicle rear side of the center of gravity of the head is thicker than a vehicle width direction inflation width at a location to the vehicle front side of the center of gravity in the fully inflated and deployed state.

In the second aspect of the present disclosure, the vehicle width direction inflation width of the rear seat chamber (simply referred to as "inflation width" hereafter) is thicker at the vehicle rear side of the center of gravity of the head of the rear seat occupant. This enables the impact absorption stroke of the rear seat chamber to be sufficiently secured while angling or curving the restraint face of the rear seat chamber toward the vehicle width direction outer side on progression toward the vehicle front side, enabling effective protection of the head.

A vehicle curtain airbag device according to a third aspect of the present disclosure is the second aspect, wherein the rear seat chamber is formed by joining together respective outer peripheral edge portions of a pair of side-face cloths that are arranged side-by-side in the vehicle width direction in the fully inflated and deployed state and of a rear-face cloth provided between rear edge portions of the pair of side-face cloths.

In the third aspect of the present disclosure, the inflation width of a rear end portion of the rear seat chamber is enlarged by the rear-face cloth, making it easier to have the inflation width of the rear seat chamber be thicker at the vehicle rear side of the center of gravity of the head of a rear seat occupant.

A vehicle curtain airbag device according to a fourth aspect of the present disclosure is the second aspect, wherein the rear seat chamber includes a pair of side-face portions that are arranged side-by-side in the vehicle width direction in the fully inflated and deployed state, and an inner tether that links the pair of side-face portions together is provided inside the rear seat chamber. In the fully inflated and deployed state, the inner tether is formed in a shape in which a vehicle width direction dimension of the inner tether increases on progression toward the vehicle rear side.

In the fourth aspect of the present disclosure, the inflation width of the rear seat chamber is restricted by the inner tether provided inside the rear seat chamber, enabling the inflation width of the rear seat chamber to be easily set to a desired width using a simple configuration.

A vehicle curtain airbag device according to a fifth aspect of the present disclosure is any one of the second aspect to the fourth aspect, wherein a rear end portion of the rear seat chamber inflates and deploys in the vehicle width direction between a headrest of a rear seat and a vehicle body side section.

In the fifth aspect of the present disclosure, due to being configured as above, it is easier to set the location of the maximum inflation width of the rear seat chamber to be further toward the vehicle rear side than the center of gravity of the head of a rear seat occupant, compared to a configuration in which the rear end portion of the rear seat chamber inflates and deploys at the vehicle front side of the headrest of the rear seat. Moreover, when a head moving toward the vehicle width direction outer side under inertia due to the impact of a side collision plunges into the rear seat chamber, and the head and the rear seat chamber have rebounded toward a vehicle width direction center side in reaction thereto, the rear end portion of the rear seat chamber hits the headrest of the rear seat. Rebound of the rear seat chamber toward the vehicle width direction center side is thereby restricted, enabling acceleration of the head due to being pushed toward the vehicle width direction center side by the rear seat chamber to be prevented or suppressed.

A vehicle curtain airbag device according to a sixth aspect of the present disclosure is the first aspect, further including an outer tether that is overlaid on the vehicle width direction inner side of the rear seat chamber and spans between both front and rear end portions of the rear seat chamber in the fully inflated and deployed state. In a non-inflated state of the rear seat chamber, the outer tether is set with a front-rear direction dimension shorter than the front-rear direction dimension of the rear seat chamber at the location where the outer tether is overlaid on the rear seat chamber.

In the sixth aspect of the present disclosure, when inflation and deployment of the rear seat chamber is complete, the outer tether spanning between both front and rear end portions of the rear seat chamber at the vehicle width direction inner side of the rear seat chamber is stretched. The rear end portion of the rear seat chamber is thus pulled toward the vehicle width direction center side by tensile force from the outer tether, and the rear seat chamber tilts in toward the vehicle width direction center side about a front end portion thereof. This enables the restraint face of the rear seat chamber to be angled or curved toward the vehicle width direction outer side on progression toward the vehicle front side, without setting the inflation width of the rear seat chamber as in the disclosure according to the second aspect.

As described above, the vehicle curtain airbag device according to the present disclosure enables rotational head injury to a rear seat occupant in a side collision to be prevented or effectively suppressed.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
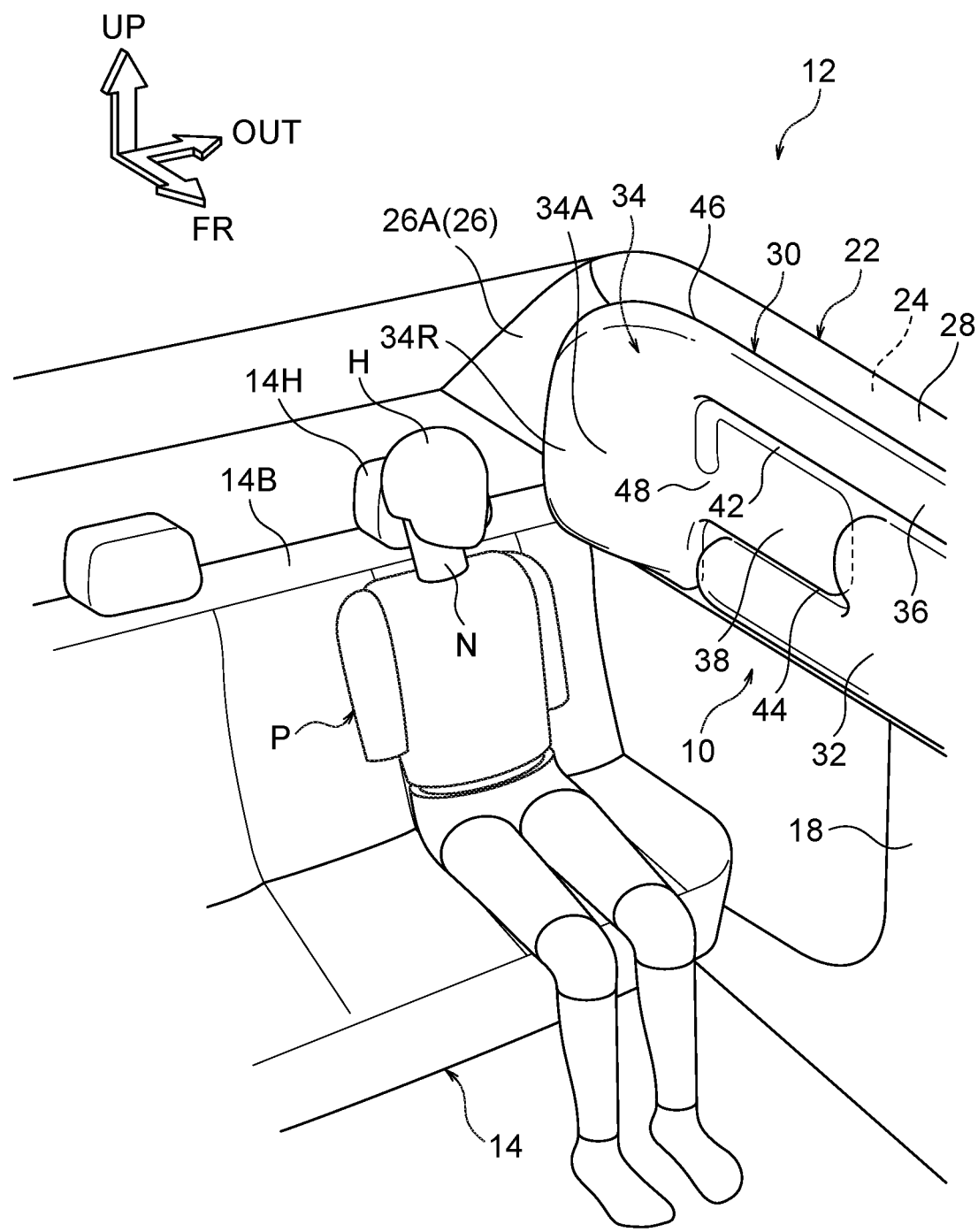
FIG. 1 is a perspective view illustrating a vehicle cabin rear section of an automobile to which a vehicle curtain airbag device according to a first exemplary embodiment of the present disclosure has been applied, illustrating a fully inflated and deployed state of a curtain airbag.

Explanation follows regarding a vehicle curtain airbag device 10 according to a first exemplary embodiment of the present disclosure, with reference to FIG. 1 to FIG. 4. Note that some reference numerals are sometimes omitted from the drawings. In each of the drawings, the arrow FR, the arrow UP, and the arrow OUT respectively indicate a forward direction (direction of travel), an upward direction, and a vehicle width direction outer side of an automobile (vehicle) 12 to which the vehicle curtain airbag device 10 has been applied, as appropriate. Hereafter, unless specifically stated otherwise, explanation referring simply to the front and rear, left and right, and up and down directions refers to front and rear in a vehicle front-rear direction, left and right in a vehicle left-right direction (vehicle width direction), and up and down in a vehicle vertical direction.

Overall Configuration of Vehicle Curtain Airbag Device 10

As illustrated in FIG. 1 to FIG. 4, the vehicle curtain airbag device 10 according to the present exemplary embodiment is installed in a sedan type automobile 12, and includes a curtain airbag 30, an inflator 50, and a control device 52. Note that in FIG. 1 to FIG. 4, a crash test dummy P is seated in a rear seat 14 of the automobile 12 instead of an actual occupant. The dummy P is, for example, a World Side Impact Dummy (WorldSID) for a 50th percentile American adult male (AM50). The dummy P is seated in the rear seat 14 using a seating method specified by side impact test protocol. The dummy P is wearing the seatbelt, not illustrated, of a three-point seatbelt device provided to the rear seat 14. Hereafter, the dummy P is referred to as "rear seat occupant P".

Figure 2:
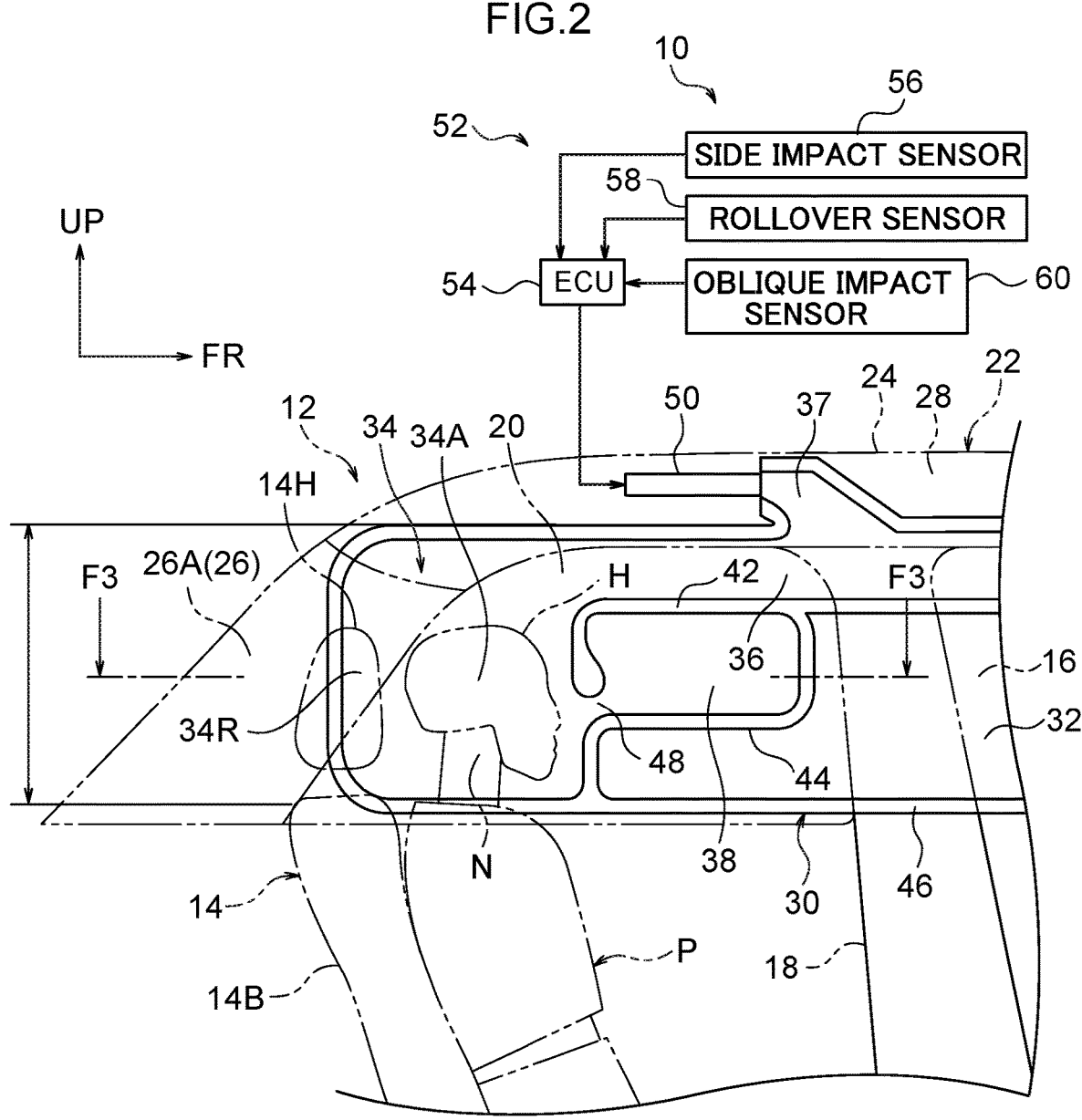
FIG. 2 is a side view of a portion of the configuration illustrated in FIG. 1, as viewed from a vehicle right side.

As illustrated in FIG. 2, the curtain airbag 30 is formed so as to inflate and deploy into a curtain shape along a front side glass 16, a B pillar 18, and a rear side glass 20 provided to a vehicle cabin side section. Plural non-illustrated tabs are provided to an upper edge portion of the curtain airbag 30. These tabs are fixed to a non-illustrated A pillar, a roof side rail 24, and a C pillar 26, at a roof side section 22 configuring an upper end portion of the vehicle cabin side section. The configuration of the curtain airbag 30 is described in detail below.

The inflator 50 is a gas generator for supplying gas to the inside of the curtain airbag 30. The inflator 50 is disposed in the vicinity of a front-rear direction intermediate portion of the curtain airbag 30, and is fixed to the roof side rail 24 through a non-illustrated bracket. A gas ejection portion of the inflator 50 is connected to a connection path 37 provided to a longitudinal direction intermediate portion of the curtain airbag 30. When the inflator 50 is actuated, gas ejected from the gas ejection portion is supplied into the curtain airbag 30.

Note that although a left side portion of a vehicle cabin rear section of the automobile 12 is illustrated in FIG. 1 to FIG. 4, the curtain airbag 30 and the inflator 50, described above, are each provided to each of the left and right sides of the automobile 12. Namely, the vehicle curtain airbag device 10 is configured including a left and right pair of curtain airbags 30 and a left and right pair of inflators 50. The left and right inflators 50 are electrically connected to the electronic control unit (ECU) 54 illustrated in FIG. 2. A side impact sensor 56, a rollover sensor 58, and an oblique impact sensor 60 are electrically connected to the ECU 54. The ECU 54, side impact sensor 56, rollover sensor 58, and oblique impact sensor 60 (none of which are illustrated outside of FIG. 2) configure the control device 52.

The side impact sensor 56 is configured to detect or predict a side collision on the automobile 12 and output a side impact signal to the ECU 54. The rollover sensor 58 is configured so as to detect or predict rollover of the automobile 12 and output a rollover signal to the ECU 54. The oblique impact sensor 60 is configured so as to detect or predict an oblique collision on the automobile 12 and output an oblique impact signal to the ECU 54.

The ECU 54 is configured to actuate the inflator 50 on the side collision side or the oblique collision side (the near side in either case) when input with a side impact signal or an oblique impact signal. The curtain airbag 30 on the near side thereby receives a supply of gas and is inflated and deployed. The ECU 54 is configured to actuate the inflator 50 on both vehicle width direction sides when input with a rollover signal. Note that the ECU 54 is configured to actuate the inflator 50 on the opposite side (far side) to that on the near side that has already been actuated, when input with a rollover signal after a side collision or after an oblique collision.

Configuration of Curtain Airbag 30

The curtain airbag 30 described above is, for example, woven into an integral bag using a one piece woven method, abbreviated as OPW. In the OPW method, a seamless bag body is formed by using a Jacquard loom to weave two pieces of fabric at once, with multiple layers being woven together at necessary locations. Note that the method of manufacturing the curtain airbag 30 is not limited to the above. For example, the curtain airbag 30 may be manufactured by stitching, into a bag shape, one or more cloths that have been formed cut-out from a nylon-based or polyester-based fabric material.

The curtain airbag 30 includes a front seat chamber 32, a rear seat chamber 34, a non-illustrated front side oblique impact chamber provided at the front side of the front seat chamber 32, a gas supply path 36 that places the front seat chamber 32 and the rear seat chamber 34 in communication with each other, and a rollover chamber 38 provided between the front seat chamber 32 and the rear seat chamber 34.

The front seat chamber 32 inflates and deploys between the head of a non-illustrated front seat occupant and a vehicle body side section (front side glass 16) so as to protect (restrain; similar applies below) the head of the front seat occupant in a side collision. The front side oblique impact chamber inflates and deploys to the front of the front seat chamber 32 so as to protect the head of a front seat occupant in an oblique collision or a rollover. The rear seat chamber 34 inflates and deploys between the head H of the rear seat occupant P and the vehicle body side section (rear side glass 20) so as to protect the head H of the rear seat occupant P in a side collision. The gas supply path 36 is provided to the upper end portion of the curtain airbag 30, and places an upper portion of the front seat chamber 32 and an upper portion of the rear seat chamber 34 in communication with each other. The connection path 37 described above extends out from the upper end portion of the gas supply path 36 toward the upper side and the rear side.

The rollover chamber 38 inflates and deploys between the front seat chamber 32 and the rear seat chamber 34 so as to protect the head H of the rear seat occupant P in an oblique collision or a rollover. The rollover chamber 38 is partitioned from the gas supply path 36 by a non-inflating portion 42 extending along the front-rear direction of the curtain airbag 30. The rollover chamber 38 is partitioned from the front seat chamber 32 by a crank-shaped non-inflating portion 44 extending from a front-rear direction intermediate portion of the non-inflating portion 42 toward a lower edge portion side of the curtain airbag 30. A lower end portion of the non-inflating portion 44 is connected to an outer periphery non-inflating portion 46 set at an outer peripheral edge portion of the curtain airbag 30. A restricted flow path 48 is formed between a rear end portion of the non-inflating portion 42 and a rear end portion of the non-inflating portion 44. The rollover chamber 38 and the rear seat chamber 34 are in communication with each other through the restricted flow path 48.

In the curtain airbag 30 configured as above, a rear end portion 34R of the rear seat chamber 34 is configured so as to inflate and deploy in the vehicle width direction between a headrest 14H of the rear seat 14 and the vehicle body side section (rear side glass 20 and C pillar garnish 26A). Namely, the rear seat chamber 34 extends toward the vehicle rear side (see arrow E in FIG. 3) such that the rear end portion 34R inflates and deploys to the vehicle rear side of a front face 14H1 of the headrest 14H (see FIG. 3 and FIG. 4; this reference numeral is omitted from other drawings). As illustrated in FIG. 2, configuration is such that in a fully inflated and deployed state of the rear seat chamber 34, the rear end portion 34R of the rear seat chamber 34 and the headrest 14H overlap as viewed along the vehicle width direction. Note that the fully inflated and deployed state mentioned above is a state in which inflation and deployment of the rear seat chamber 34 is complete and is prior to the head H of the rear seat occupant P being restrained by the rear seat chamber 34 (deployed state prior to restraint; an unrestrained state).

Figure 3:
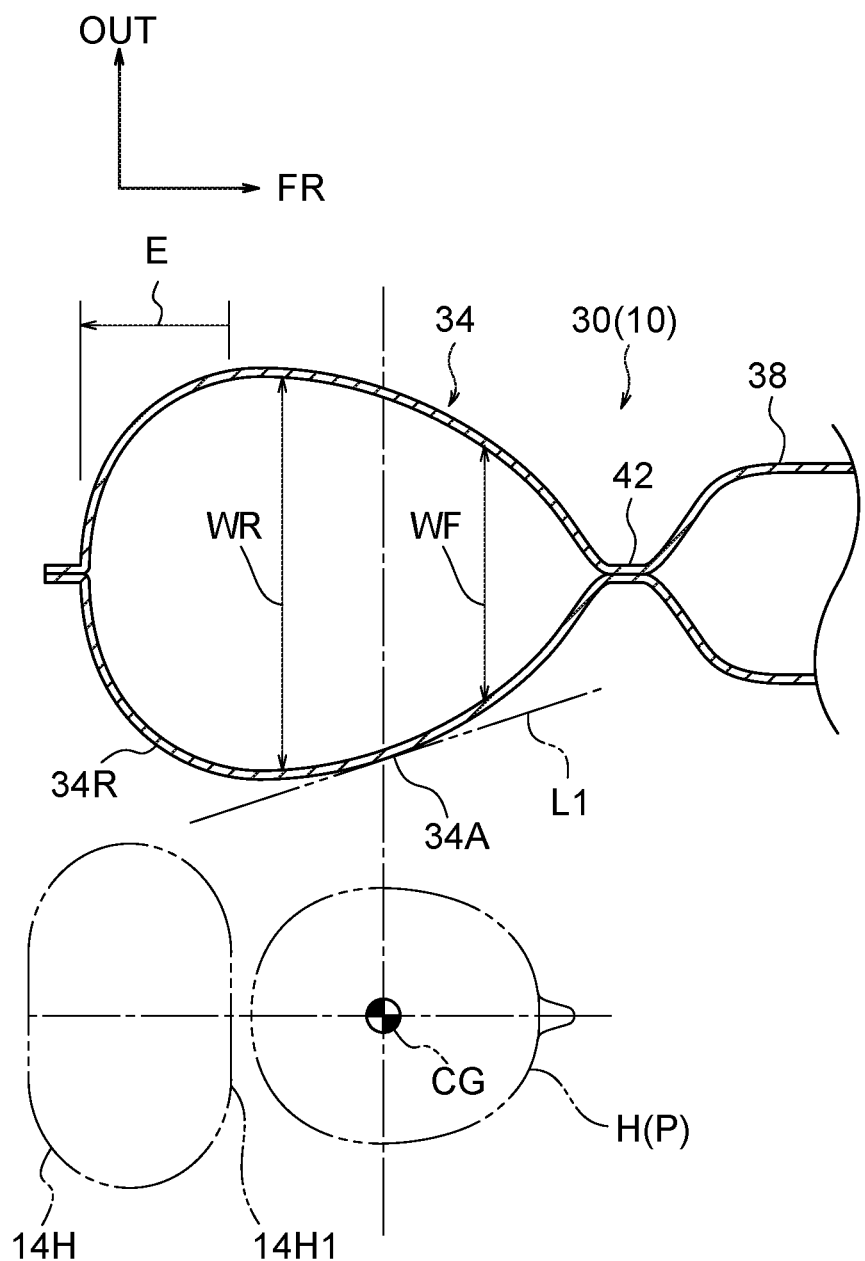
FIG. 3 is an enlarged cross-section illustrating an enlargement of a cross-section sectioned on line F3-F3 in FIG. 2.

The rear seat chamber 34 is formed extending toward the vehicle rear side as described above such that the vehicle width direction inflation width (inflation thickness, bag thickness) of the rear seat chamber 34 is thicker at the rear end portion 34R side. Specifically, as illustrated in FIG. 3, in the fully inflated and deployed state, the rear seat chamber 34 forms a shape in which a vehicle width direction inflation width WR at a location to the vehicle rear side of the center of gravity CG of a head H is thicker than a vehicle width direction inflation width WF at a location to the vehicle front side of the center of gravity CG The rear seat chamber 34 is thereby configured such that a restraint face 34A, which opposes the head H in the vehicle width direction (overlapping as viewed along the vehicle width direction), curves toward the vehicle width direction outer side on progression toward the vehicle front side in the fully inflated and deployed state (see the tangent line L1 of the restraint face 34A illustrated in FIG. 3 and FIG. 4). Note that the above inflation widths WR, WF are set by adjusting the dimension along which the rear seat chamber 34 is extended toward the vehicle rear side and by adjusting the positions of the rear end portions 44, 42. The inflation widths WR, WF and the curved shape of the restraint face 34A described above can be compared by, for example, supplying air to the inside of the curtain airbag 30 under normal conditions using a pneumatic pump or the like so as to inflate the curtain airbag 30.

The curtain airbag 30 configured as above is folded in the vehicle vertical direction into an elongated shape and then stowed together with the inflator 50 in a roof side section 22. The method of folding the curtain airbag 30 is, for example, a predetermined folding method that includes at least one out of rolling or pleating. In the stowed state of the curtain airbag 30, the curtain airbag 30 extends from the A pillar to the C pillar 26 across the roof side section 22, and the curtain airbag 30 and the inflator 50 are covered from the inside of the vehicle cabin by a non-illustrated A pillar garnish, a roof head lining 28, and the C pillar garnish 26A. In the curtain airbag 30, the rear end portion 34R of the folded-up rear seat chamber 34 is provided at a location that is covered by the C pillar garnish 26A.

Operation and Advantageous Effects

Explanation follows regarding the operation and advantageous effects of the first exemplary embodiment.

In the vehicle curtain airbag device 10 configured as above, when a side collision on the automobile 12 is detected or predicted by the side impact sensor 56, the inflator 50 is actuated by the ECU 54. Gas from the inflator 50 thus passes through the connection path 37 and the gas supply path 36 and is supplied to the front seat chamber 32 and the rear seat chamber 34. As a result, the front seat chamber 32 inflates and deploys between the head of a front seat occupant and the front side glass 16, and the rear seat chamber 34 inflates and deploys between the head H of the rear seat occupant P and the rear side glass 20. Some of the gas supplied to the front seat chamber 32 passes through a non-illustrated restricted flow path and is supplied to the front side oblique impact chamber, and some of the gas supplied to the rear seat chamber 34 passes through the restricted flow path 48 and is supplied to the rollover chamber 38. The front side oblique impact chamber and the rollover chamber 38 thus inflate and deploy after a delay with respect to the front seat chamber 32 and the rear seat chamber 34.

Note that the restraint face 34A of the rear seat chamber 34 described above, which opposes the head H in the vehicle width direction, curves toward the vehicle width direction outer side on progression toward the vehicle front side in the fully inflated and deployed state. Thus, the rebound direction (recoil direction) of a head H that has plunged into the restraint face 34A due to the impact of a side collision and is rebounding toward the vehicle width direction center side is more easily angled toward the vehicle front side with respect to the vehicle width direction. As a result, the head H that has rebounded is less likely to make contact with a seatback 14B or the headrest 14H of the rear seat 14 (in particular, is less likely to contact the headrest 14H). Moreover, even if the head H were to make contact with the seatback 14B, the timing of contact would be delayed and the speed of the head H would be reduced, thereby reducing the rotational force acting on the head H at the time of contact.

The advantageous effects mentioned above will be explained with reference to the vehicle curtain airbag device 100 illustrated in FIG. 4 and FIG. 5 (hereafter referred to as "comparative example 100"). Note that in FIG. 5, similar configuration to that of the present exemplary embodiment is appended with the same reference numerals. A curtain airbag 30' of a comparative example 100 is configured such that a rear seat chamber 34' does not extend toward the vehicle rear side as in the present exemplary embodiment, and such that in a fully inflated and deployed state, a restraint face 34A' of the rear seat chamber 34' curves toward the vehicle width direction inner side on progression toward the vehicle front side (see the tangent line L2 of the restraint face 34A' illustrated in FIG. 4). Other configuration is similar to that of the present exemplary embodiment.

Figure 4:
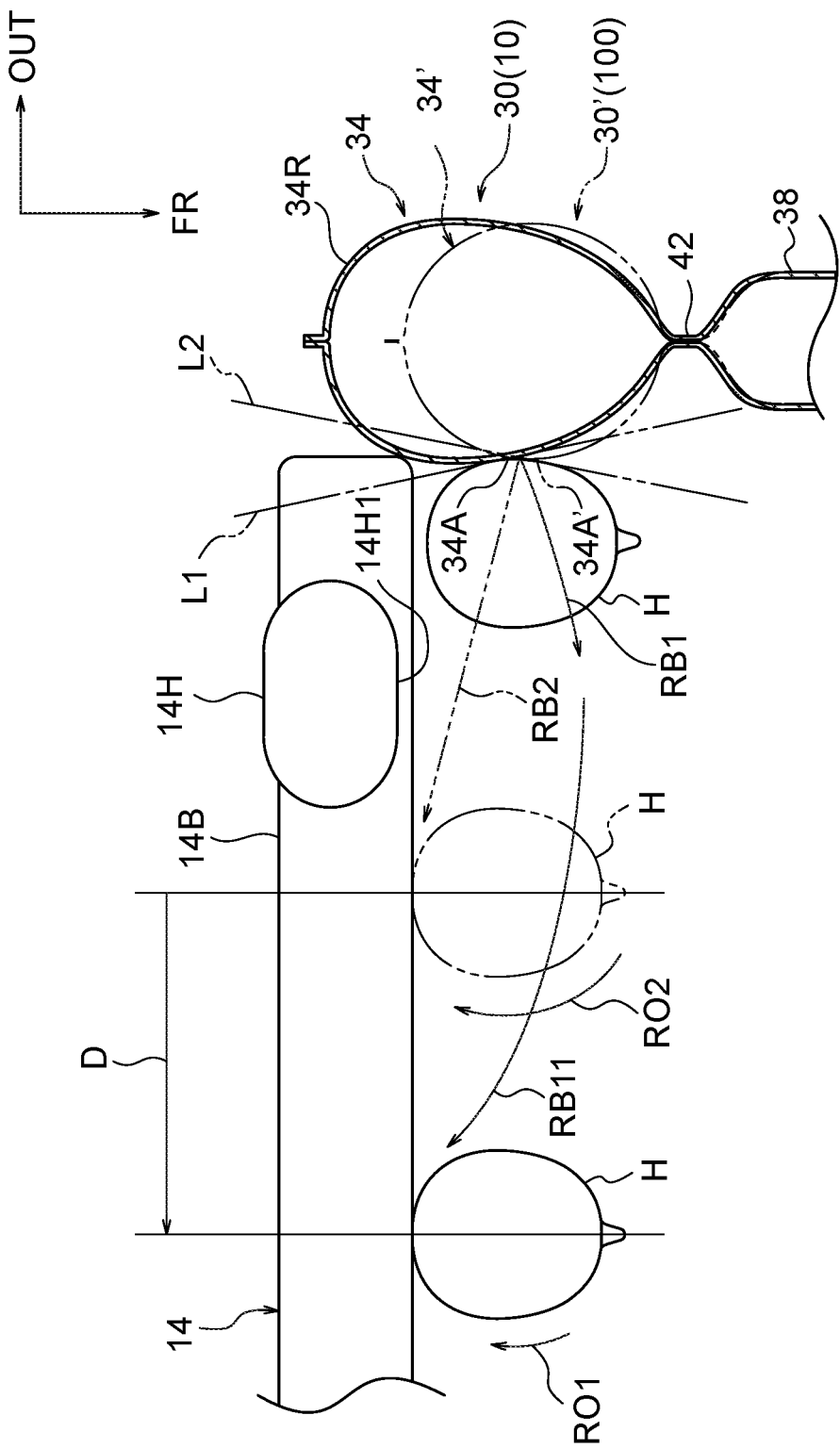
FIG. 4 is a horizontal cross-section for explaining the difference between rebound directions of the head of a rear seat occupant in the first exemplary embodiment and a comparative example.
Figure 5:
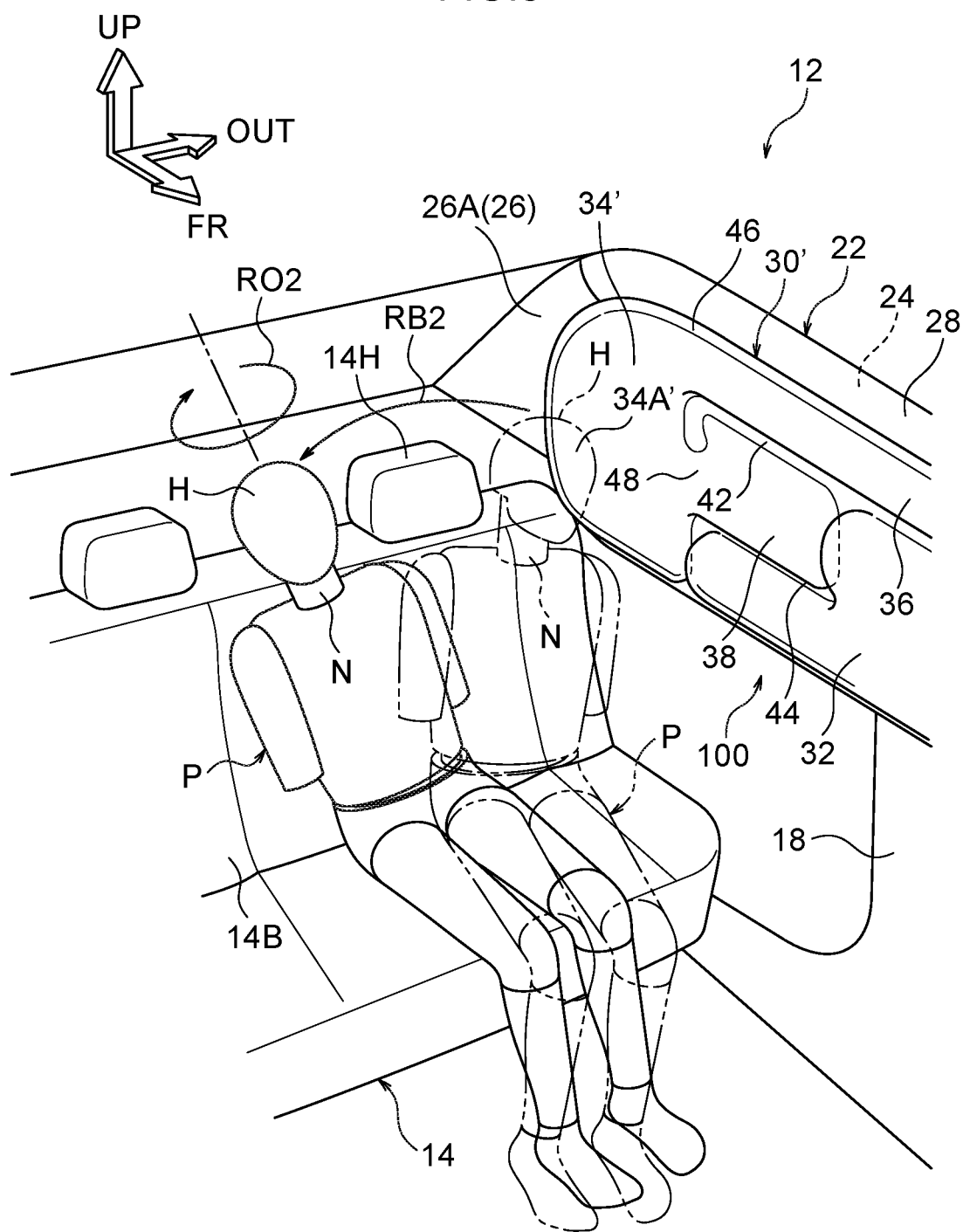
FIG. 5 is a perspective view corresponding to FIG. 1 illustrating a comparative example.

In the comparative example 100, the rebound direction of a head H that has been plunged into the restraint face 34A' due to the impact of a side collision is angled toward the vehicle rear side with respect to the vehicle width direction (see arrow RB2 in FIG. 4). The action of frictional force arising when the head H that has rebounded makes contact with the seatback 14B thereby causes rotational force about the neck N axis to act on the head H (see arrow RO2 in FIG. 4 and FIG. 5). As a result, rotational head injury (Brain Rotational Injury Criterion; known as BrIC) may occur.

In contrast thereto, in the present exemplary embodiment, as described above, the rebound direction the head H off the rear seat chamber 34 is more easily angled toward the vehicle front side with respect to the vehicle width direction (see arrow RB1 in FIG. 4), and a head H that has rebounded is less likely to make contact with the seatback 14B or the headrest 14H of the rear seat 14. In addition, in cases in which a rear seat occupant P is restrained by a three-point seatbelt, restraint force from the seatbelt acting toward the vehicle rear side that is borne by the rear seat occupant P causes the direction of movement of a head H that has rebounded in the arrow RB1 direction in FIG. 4 to change toward the vehicle rear side (see arrow RB11 in FIG. 4). As a result, even if the head H were to make contact with the seatback 14B of the rear seat 14, the timing of contact would be delayed (see arrow D in FIG. 4). The speed of the head H is thereby reduced, reducing the rotational force acting on the head H at the time of contact (see arrow RO1 in FIG. 4). The present exemplary embodiment thereby enables rotational head injury of the rear seat occupant P in a side collision to be prevented or effectively suppressed.

In addition, in the comparative example 100 above, in the process of the head H rebounding off the rear seat chamber 34', the rear seat chamber 34' rebounds (swings) toward the vehicle width direction center side together with the head H, and the rear seat chamber 34' may continuously push the head H toward the vehicle width direction center side so as to cause the head H to accelerate. When the accelerated head H makes contact with the seatback 14B, the rotational force RO2 that acts on the head H is increased.

Regarding this point, in the present exemplary embodiment, the rear end portion 34R of the rear seat chamber 34 is configured so as to inflate and deploy in the vehicle width direction between the headrest 14H of the rear seat 14 and the vehicle body side section. Thus, when the rear seat chamber 34 rebounds (swings) toward the vehicle width direction center side together with the head H, the rear seat chamber 34 hits the headrest 14H of the rear seat 14. Swinging of the rear seat chamber 34 toward the vehicle width direction center side is thereby restricted, enabling acceleration of the head H due to being pushed by the rear seat chamber 34 to be prevented or suppressed.

Note that in the occupant head protecting airbag device described under Related Art, a rear end lower portion of the rear seat chamber and the C pillar are coupled together through a rear side strap. The rear side strap suppresses swinging of the rear seat chamber toward the vehicle width direction center side, enabling acceleration of the head H as in the above comparative example 100 to be prevented or suppressed. However, in order to apply a rear side strap such as described above, careful consideration needs to be given to the design in order to pull the rear side strap out from the C pillar garnish during inflation and deployment of the curtain airbag, with this restricting styling around the C pillar garnish. Countermeasures to prevent breaking and shattering of the C pillar garnish are also required. Consequently, the placement region for the rear side strap is limited, and application of the rear side strap may be difficult. Regarding this point, in the present exemplary embodiment, the swinging described above can be restricted (suppressed) without use of a rear side strap. As a result, acceleration of the head H of a rear seat occupant P due to being continuously pushed toward the vehicle width direction center side by the rear seat chamber 34 can be prevented or suppressed without the need for careful consideration being given to the design in order to pull a rear side strap out from the C pillar garnish.

In addition, in the present exemplary embodiment, in the fully inflated and deployed state, the rear seat chamber 34 is configured such that the vehicle width direction inflation width WR at a location to the vehicle rear side of the center of gravity CG of the head H is thicker than a vehicle width direction inflation width WF at a location to the vehicle front side of the center of gravity CG. This enables the impact absorption stroke of the rear seat chamber 34 to be sufficiently secured while curving the restraint face 34A of the rear seat chamber 34 curved toward the vehicle width direction outer side on progression toward the vehicle front side, enabling effective protection of the head H.

Moreover, in the present exemplary embodiment, as described above, the rear end portion 34R of the rear seat chamber 34 inflates and deploys in the vehicle width direction between the headrest 14H of the rear seat 14 and the vehicle body side section. Thus, it is easier to set the location of the maximum vehicle width direction inflation width of the rear seat chamber 34 to be further toward the vehicle rear side than the center of gravity CG of a head H, compared to a configuration in which the rear end portion 34R of the rear seat chamber 34 inflates and deploys at the vehicle front side of the headrest 14H.

Further, in the present exemplary embodiment, the rear seat chamber 34 extends toward the vehicle rear side such that the vehicle width direction inflation width of the rear seat chamber 34 is configured so as to be thicker at the rear end portion 34R side. Special configuration (such as a tether) for thickening the inflation width of the rear seat chamber 34 at the rear end portion 34R side is therefore not needed, contributing to simplification of the configuration.

Explanation follows regarding other exemplary embodiments of the present disclosure. Note that configuration and operation that is basically the same as that in the first exemplary embodiment is appended with the same reference numeral as in the first exemplary embodiment, and explanation thereof is omitted.

Second Exemplary Embodiment

Figure 6:
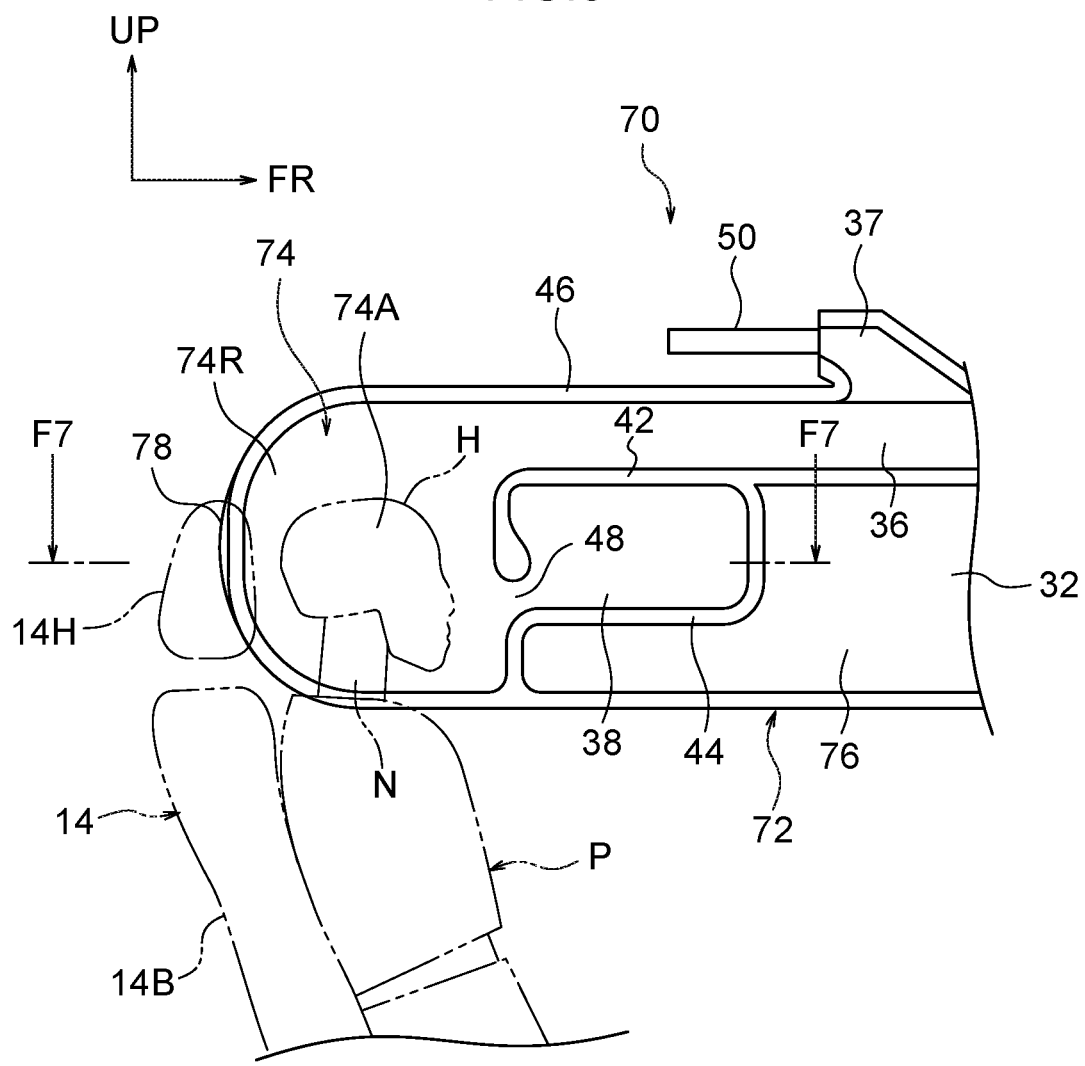
FIG. 6 is a side view corresponding to a portion of FIG. 2 illustrating a vehicle curtain airbag device according to a second exemplary embodiment of the present disclosure in a state in which a curtain airbag is fully inflated and deployed.
Figure 7:
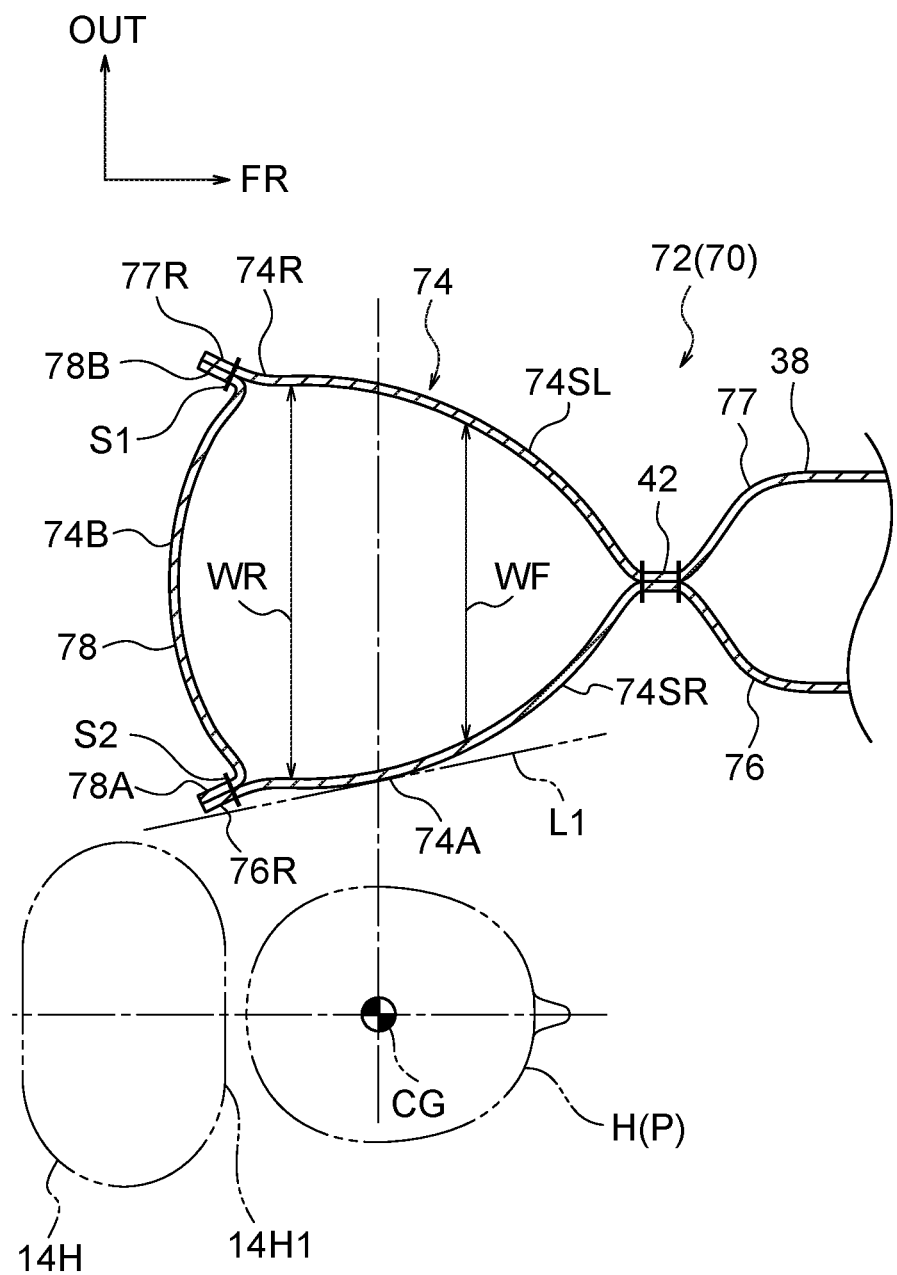
FIG. 7 is an enlarged cross-section illustrating an enlargement of a cross-section sectioned on line F7-F7 in FIG. 6.
Figure 8:
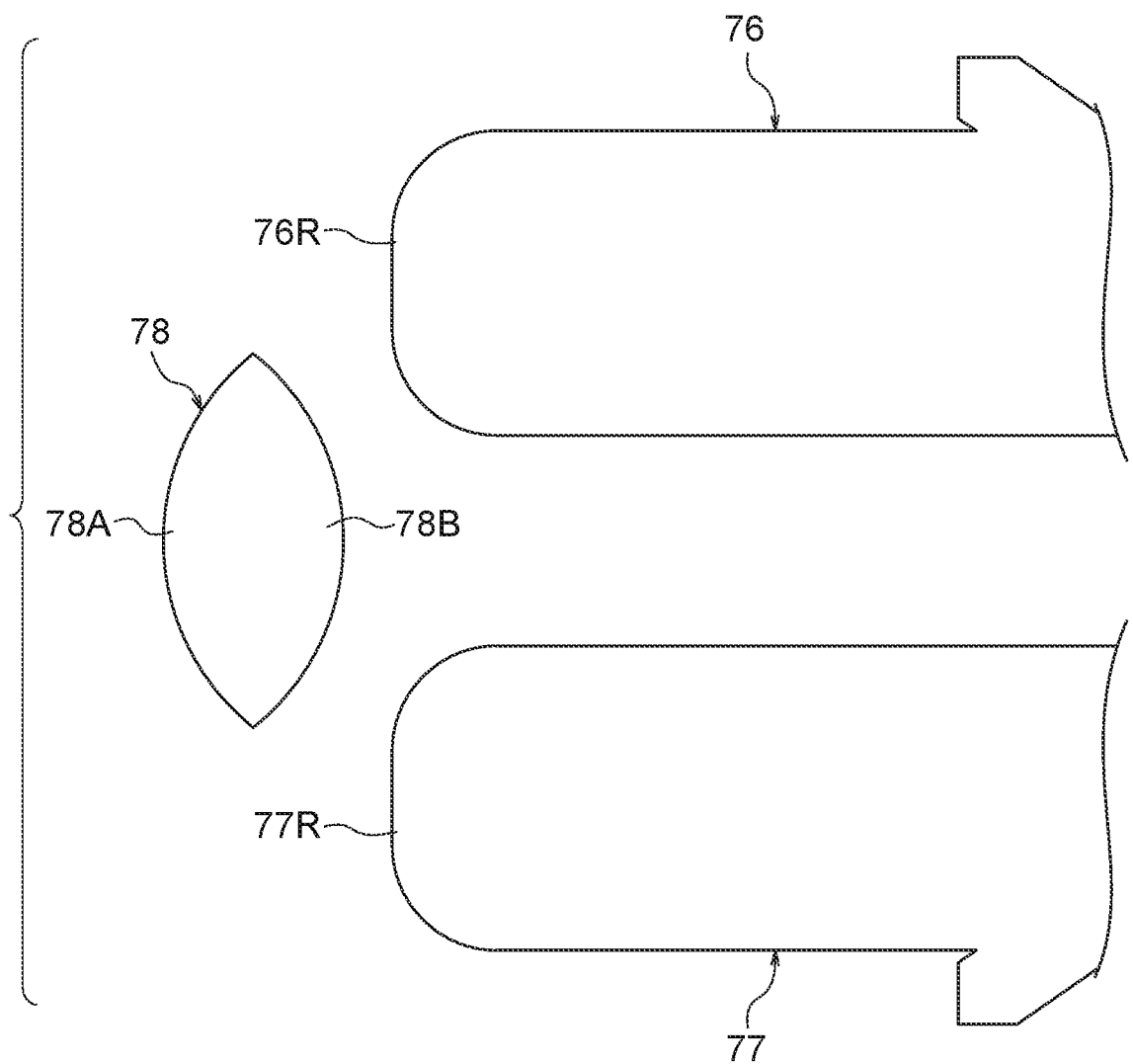
FIG. 8 is a plan view illustrating an opened-out side-face cloth and rear-face cloth pair that configure a curtain airbag according to the second exemplary embodiment.

An inflated and deployed state of a curtain airbag 72 of a vehicle curtain airbag device 70 according to a second exemplary embodiment of the present disclosure is illustrated in the side view of FIG. 6, which corresponds to a portion of FIG. 2. A cabin-inner-side cloth 76, a cabin-outer-side cloth 77, and a rear-face cloth 78, illustrated in FIG. 7 and FIG. 8, are stitched together at their respective outer peripheral edge portions to form the curtain airbag 72. The cabin-inner-side cloth 76 and the cabin-outer-side cloth 77 correspond to the "pair of side-face cloths" of the present disclosure. In the inflated and deployed state of the curtain airbag 72, the cabin-inner-side cloth 76 and the cabin-outer-side cloth 77 are arranged side-by-side in the vehicle width direction, with the cabin-inner-side cloth 76 positioned at vehicle width direction center side and the cabin-outer-side cloth 77 positioned at the vehicle width direction outer side, and the rear-face cloth 78 is disposed between rear edge portions 76R, 77R of the cabin-inner-side cloth 76 and the cabin-outer-side cloth 77. The rear edge portions 76R, 77R of the cabin-inner-side cloth 76 and the cabin-outer-side cloth 77, and both width direction end portions 78A, 78B of the rear-face cloth 78, are stitched (joined) together at the stitch portions S1, S2 illustrated in FIG. 7. The cabin-inner-side cloth 76 and the cabin-outer-side cloth 77 are also stitched (joined) together at non-illustrated stitch portions forming the non-inflating portions 42, 44 and the outer periphery non-inflating portion 46.

In the curtain airbag 72, the cabin-inner-side cloth 76 and the cabin-outer-side cloth 77 configure side-face portions 74SL, 74SR (reference numerals for which are omitted outside of FIG. 7) of a rear seat chamber 74, and the rear-face cloth 78 configures a rear-face portion 74B (not illustrated outside of FIG. 7) of the rear seat chamber 74. In the fully inflated and deployed state of the rear seat chamber 74, configuration is such that a rear end portion 74R of the rear seat chamber 74 is positioned further toward the vehicle front side than in the first exemplary embodiment. By providing the rear-face cloth 78 to the rear seat chamber 74, the rear seat chamber 74 is formed such that the vehicle width direction inflation width of the rear seat chamber 74 is thicker at the rear end portion 74R side. The rear seat chamber 74 is thereby configured such that a restraint face 74A, which opposes the head H in the vehicle width direction, curves toward the vehicle width direction outer side on progression toward the vehicle front side in the fully inflated and deployed state (see the tangent line L1 of the restraint face 74A illustrated in FIG. 7). Other configuration in the present exemplary embodiment is the same as that of the first exemplary embodiment.

In the present exemplary embodiment, the rebound direction of a head H that has been plunged into the restraint face 74A due to the impact of a side collision and is rebounding toward the vehicle width direction center side is more easily angled toward the vehicle front side with respect to the vehicle width direction. Similarly to in the first exemplary embodiment, this enables rotational head injury of a rear seat occupant P in a side collision to be prevented or effectively suppressed. Moreover, in the present exemplary embodiment, the vehicle width direction inflation width at the rear end portion of the rear seat chamber 74 is enlarged by the rear-face cloth 78, making it easier to have the inflation width of the rear seat chamber 74 be thicker at the vehicle rear side of the center of gravity CG of the head H of a rear seat occupant P. This enables the amount of overlap (overlap amount) between the rear end portion 74R of the rear seat chamber 74 in the fully inflated and deployed state and the headrest 14H, as viewed along the vehicle width direction, to be reduced or eliminated, which is favorable in cases in which, for example, the gap between the headrest 14H and the vehicle body side section is narrow.

Third Exemplary Embodiment

Figure 9:
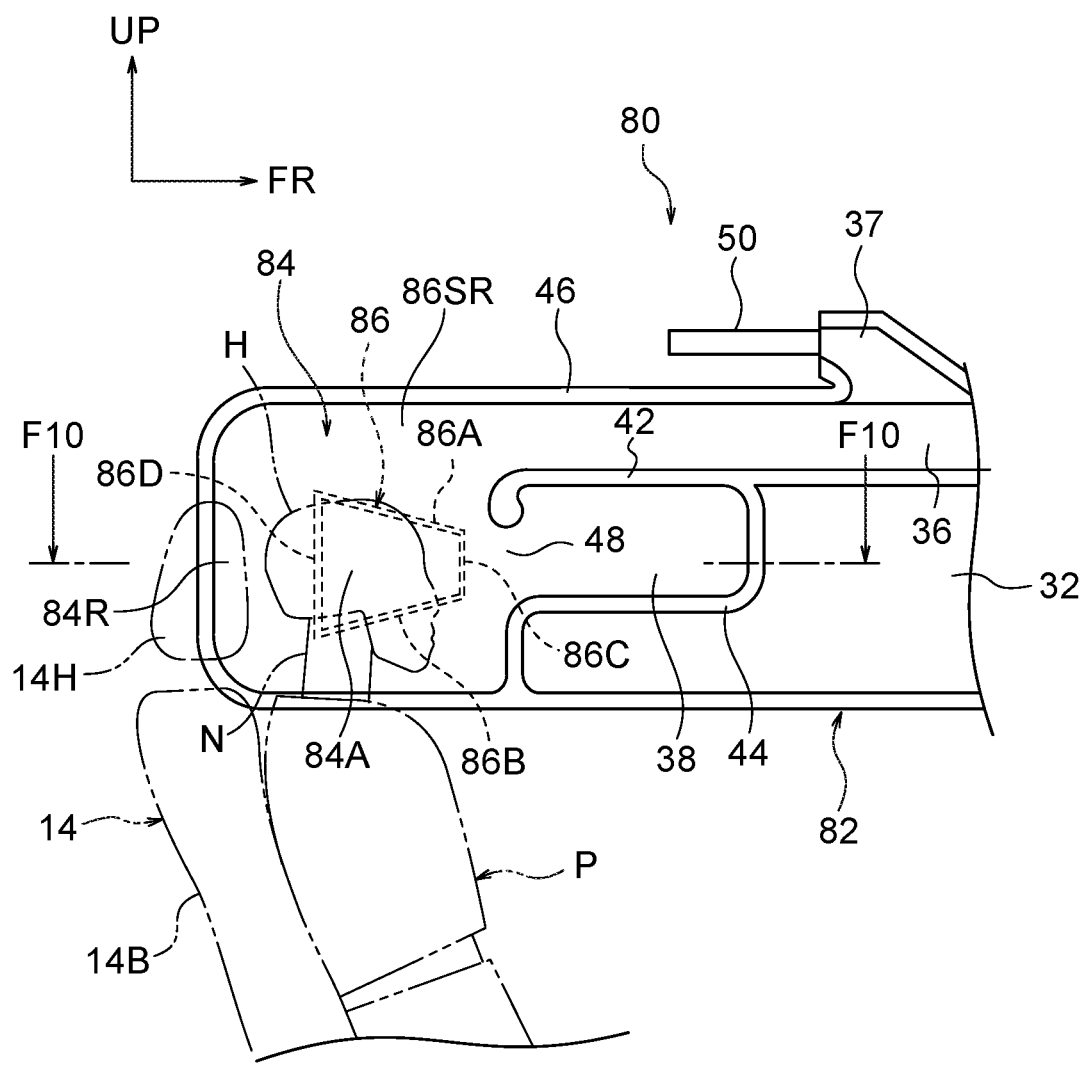
FIG. 9 is a side view corresponding to a portion of FIG. 2 illustrating a vehicle curtain airbag device according to a third exemplary embodiment of the present disclosure in a state in which a curtain airbag is fully inflated and deployed.
Figure 10:
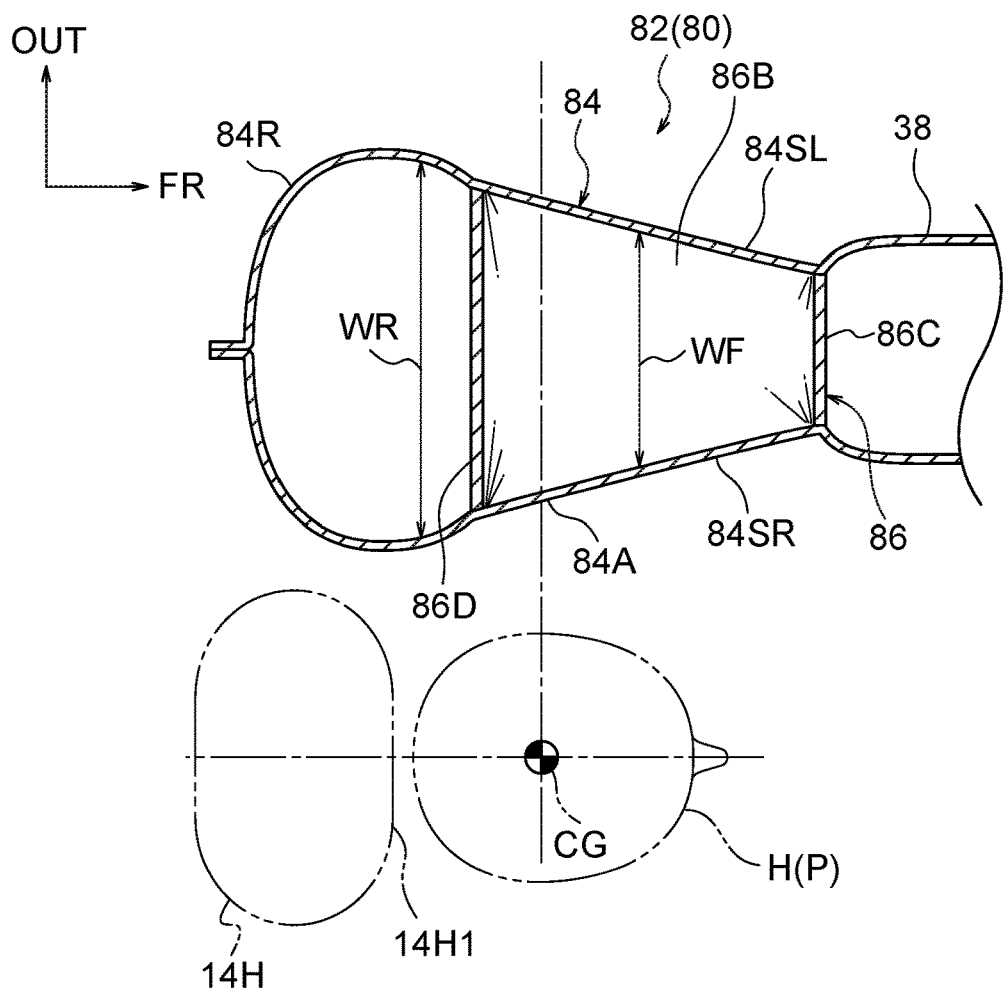
FIG. 10 is an enlarged cross-section illustrating an enlargement of a cross-section sectioned on line F10-F10 in FIG. 9.

A fully inflated and deployed state of a curtain airbag 82 of a vehicle curtain airbag device 80 according to a third exemplary embodiment of the present disclosure is illustrated in the side view of FIG. 9, which corresponds to a portion of FIG. 2. As illustrated in FIG. 10, a rear seat chamber 84 of the curtain airbag 82 includes a pair of side-face portions 84SL, 84SR that are arranged side-by-side in the vehicle width direction in the fully inflated and deployed state. An inner tether 86 provided inside the rear seat chamber 84 links the pair of side-face portions 84SL, 84SR.

Figure 11:
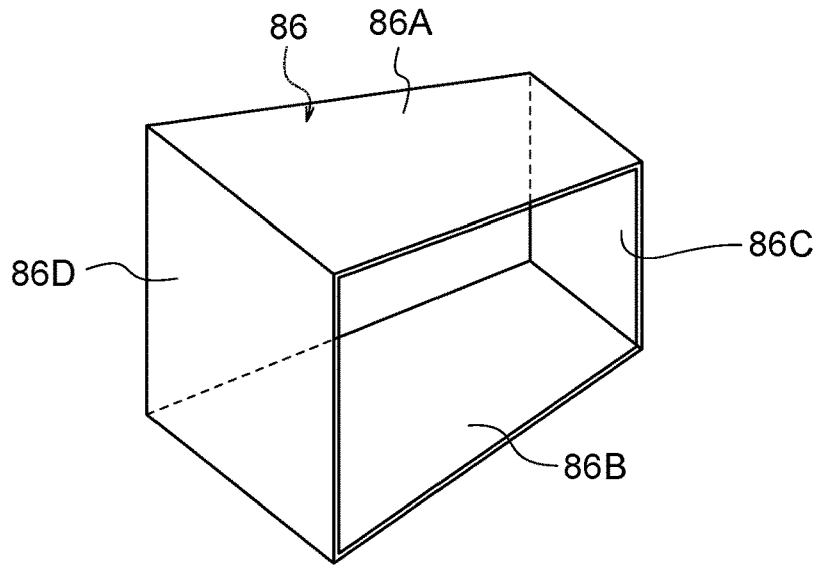
FIG. 11 is a perspective view of a tether according to the third exemplary embodiment.

Similarly to the rear seat chamber 34 according to the first exemplary embodiment, a rear end portion 84R of the rear seat chamber 84 is configured so as to inflate and deploy between the headrest 14H and the vehicle body side section. As illustrated in FIG. 11, elongated-strip-shaped cloths are stitched into a rectangular loop shape to form the inner tether 86. The inner tether 86 includes an upper-face portion 86A, a lower-face portion 86B, a front-face portion 86C, and a rear-face portion 86D. Width direction end portions of the upper-face portion 86A, lower-face portion 86B, front-face portion 86C, and rear-face portion 86D are stitched to the side-face portions 84SL, 84SR at non-illustrated stitch portions. The upper-face portion 86A and the lower-face portion 86B are each formed in a shape having a vehicle width direction dimension that increases on progression toward the vehicle rear side (a trapezoid shape) in a fully inflated and deployed state. The upper-face portion 86A and the lower-face portion 86B oppose each other in the vehicle vertical direction. The front-face portion 86C and the rear-face portion 86D are formed in rectangular shapes, and the front-face portion 86C and the rear-face portion 86D oppose each other in the vehicle front-rear direction in the fully inflated and deployed state. The vehicle width direction dimensions and the vehicle vertical direction dimensions of the rear-face portion 86D are set so as to be larger than that of the front-face portion 86C in the fully inflated and deployed state.

By providing the inner tether 86 inside the rear seat chamber 84, the vehicle width direction inflation width of the rear seat chamber 84 is formed so as to be thicker at the rear end portion 84R side. The rear seat chamber 84 is thereby configured such that a restraint face 84A, which opposes the head H in the vehicle width direction, is angled or curved toward the vehicle width direction outer side on progression toward the vehicle front side in the fully inflated and deployed state. Note that a non-illustrated opening for supplying gas from the inflator 50 to the inside of the inner tether 86 is formed in at least one of the upper-face portion 86A, the lower-face portion 86B, the front-face portion 86C, or the rear-face portion 86D. Other configuration in the present exemplary embodiment is the same as that of the first exemplary embodiment.

In the present exemplary embodiment, the rebound direction of a head H that has been plunged into the restraint face 84A due to the impact of a side collision and is rebounding toward the vehicle width direction center side is more easily angled toward the vehicle front side with respect to the vehicle width direction. Similarly to in the first exemplary embodiment, this enables rotational head injury of a rear seat occupant P in a side collision to be prevented or effectively suppressed. Moreover, in the present exemplary embodiment, the inflation width of the rear seat chamber 84 is restricted by the inner tether 86 provided inside the rear seat chamber 84, enabling the inflation width of the rear seat chamber 84 to be easily set to a desired width using a simple configuration.

Fourth Exemplary Embodiment

Figure 12:
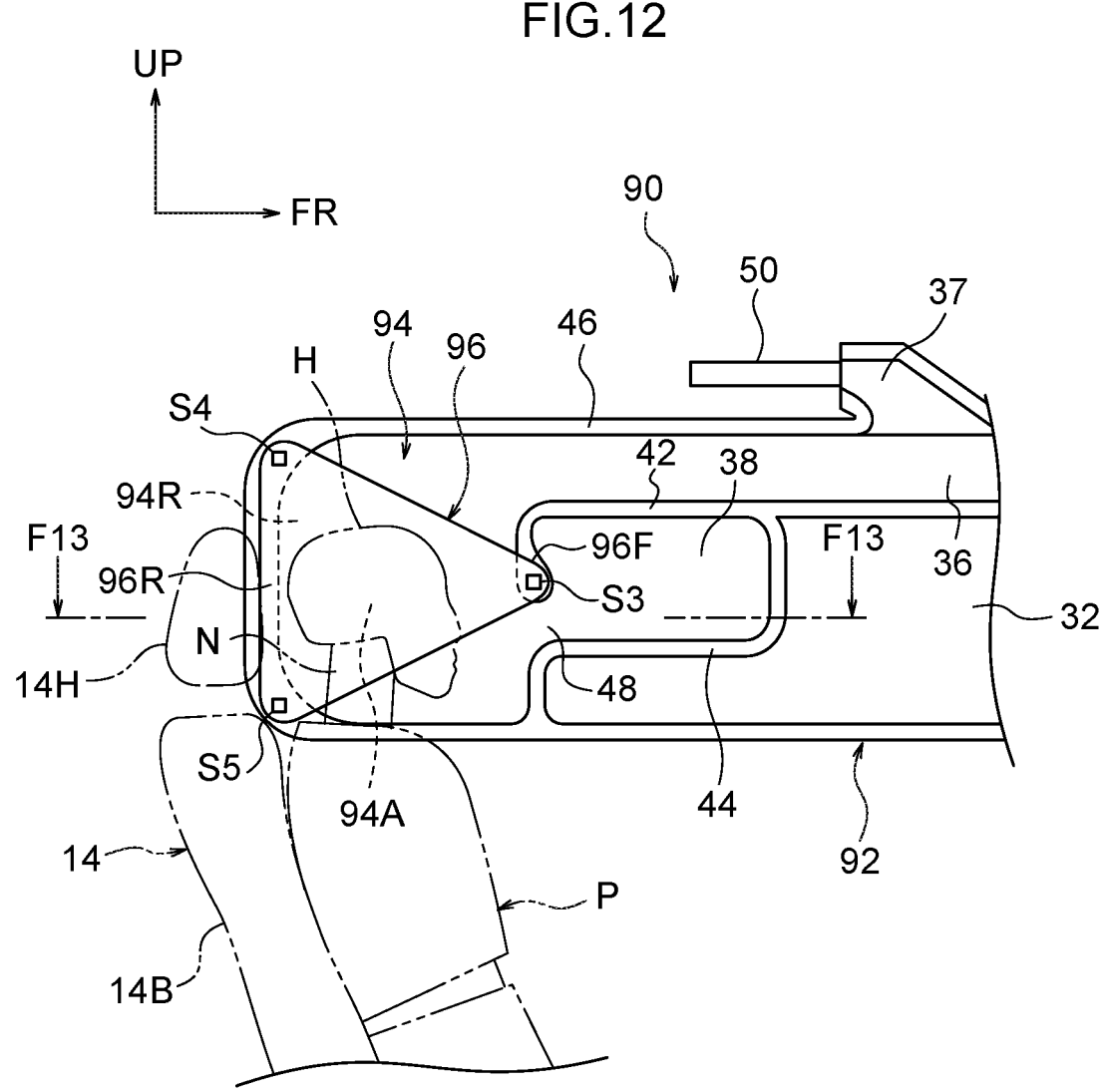
FIG. 12 is a side view corresponding to a portion of FIG. 2 illustrating a vehicle curtain airbag device according to a fourth exemplary embodiment of the present disclosure in a state in which a curtain airbag is fully inflated and deployed.

A fully inflated and deployed state of a curtain airbag 92 of a vehicle curtain airbag device 90 according to a fourth exemplary embodiment of the present disclosure is illustrated in the side view of FIG. 12, which corresponds to a portion of FIG. 2. The curtain airbag 92 is configured such that in the fully inflated and deployed state of a rear seat chamber 94, a rear portion 94R of the rear seat chamber 94 is positioned further toward the vehicle front side than in the first exemplary embodiment. In addition, the curtain airbag 92 includes an outer tether 96 that is overlaid onto the vehicle width direction inner side of the rear seat chamber 94 in the fully inflated and deployed state. A cloth similar to the cloth of the curtain airbag 92 is cut out into a substantially triangular shape to form the outer tether 96.

Figure 13:
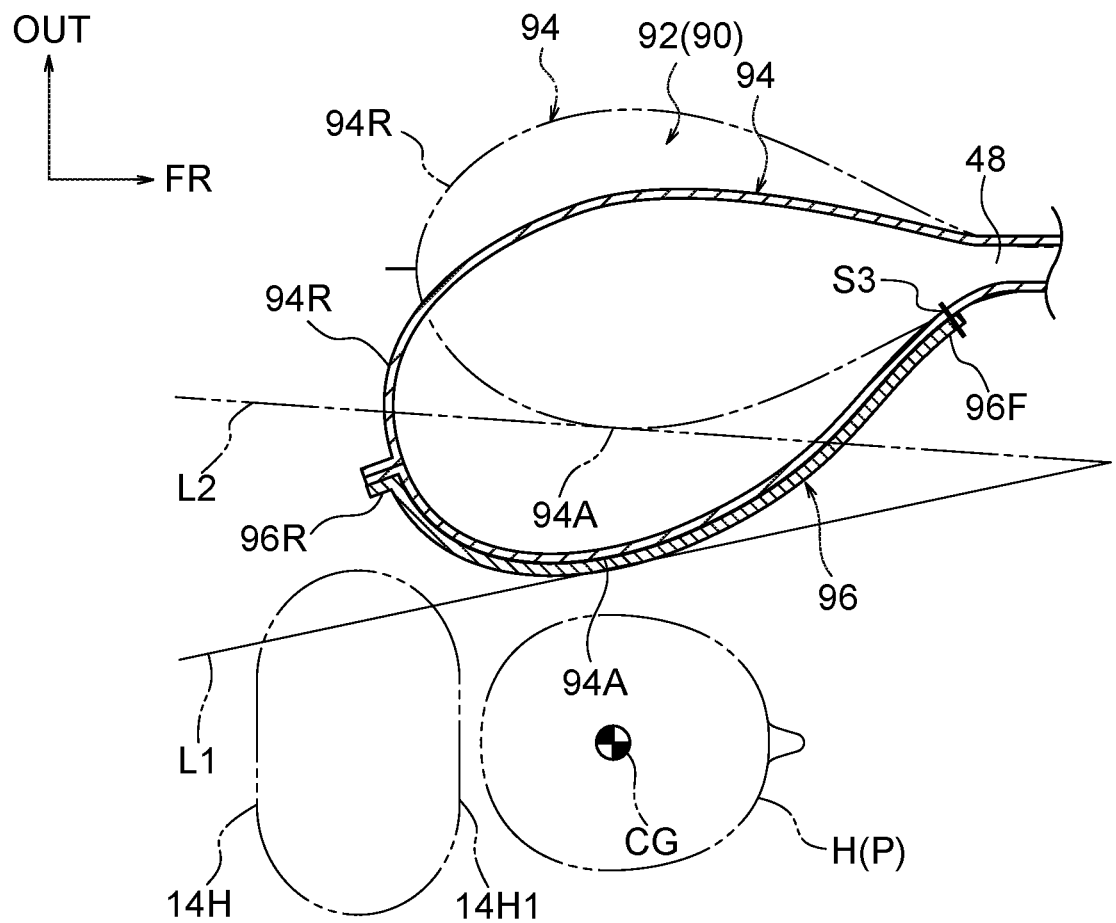
FIG. 13 is an enlarged cross-section illustrating an enlargement of a cross-section sectioned on line F13-F13 in FIG. 12.
Figure 14:
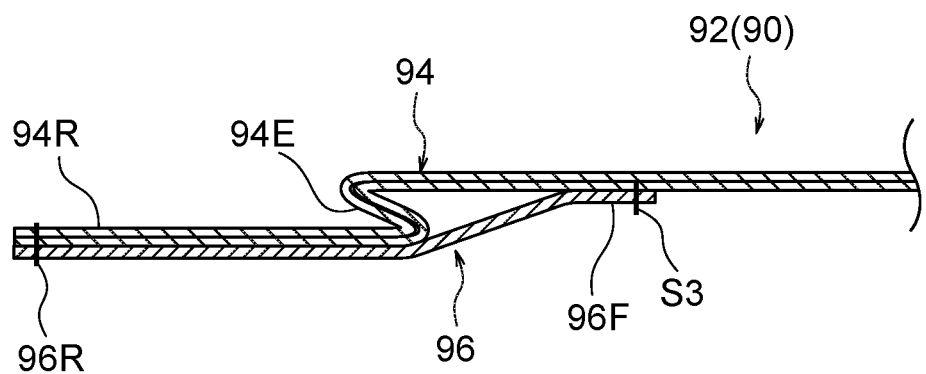
FIG. 14 is a cross-section illustrating the curtain airbag illustrated in FIG. 13 in a non-inflated state.

One vertex of the outer tether 96 is provided at a front end portion 96F, and the other two vertices of the outer tether 96 are provided at respective upper and lower end portions of a rear end portion 96R. The front end portion 96F of the outer tether 96 is stitched to a rear end portion of the non-inflating portion 42 so as to be anchored thereto (see stitch portion S3 in FIG. 12 and FIG. 13). Each of the upper and lower end portions of the rear end portion 96R of the outer tether 96 are stitched to a respective upper or lower end portion of a rear end portion of the outer periphery non-inflating portion 46 so as to be anchored thereto (see stitch portions S4, S5 in FIG. 12). The outer tether 96 thereby spans between both front and rear end portions of the rear seat chamber 94. As illustrated in FIG. 14, in a non-inflated state of the rear seat chamber 94 (a non-inflated, opened-out state), the outer tether 96 is set with a vehicle front-rear direction dimension shorter than the vehicle front-rear direction dimension of the rear seat chamber 94 at the location where the outer tether 96 is overlaid on the rear seat chamber 94. Accordingly, in the non-inflated state of the rear seat chamber 94, an excess length portion 94E at a front-rear direction intermediate portion of the rear seat chamber 94 is configured in a Z-fold. Other configuration in the present exemplary embodiment is the same as that of the first exemplary embodiment.

In the present exemplary embodiment, when inflation and deployment of the rear seat chamber 94 is complete, the outer tether 96 spanning between both front and rear end portions of the rear seat chamber 94 at the vehicle width direction inner side of the rear seat chamber 94 is stretched. The rear end portion of the rear seat chamber 94 is thus pulled toward the vehicle width direction center side by tensile force from the outer tether 96, and the rear seat chamber 94 tilts in (bends) toward the vehicle width direction center side about a front end portion thereof (a bending position). The rear seat chamber 94 thereby adopts a state in which a restraint face 94A, which opposes the head H in the vehicle width direction, is curved toward the vehicle width direction outer side on progression toward the vehicle front side in the fully inflated and deployed state.

In the present exemplary embodiment, the rebound direction of a head H that has been plunged into the restraint face 94A due to the impact of a side collision and is rebounding toward the vehicle width direction center side is more easily angled toward the vehicle front side with respect to the vehicle width direction. Similarly to in the first exemplary embodiment, this enables rotational head injury of a rear seat occupant P in a side collision to be prevented or effectively suppressed. Moreover, the present exemplary embodiment is configured such that the rear seat chamber 94 is bent (tilted) by the outer tether 96 as described above, and so there is no need to adjust the inflation width of the rear seat chamber 94 so as to be thicker at the rear portion 94R side. Accordingly, the advantageous effects described above are able to be obtained by, for example, adding an outer tether to an existing curtain airbag.

Supplementary Explanation of the Above Exemplary Embodiments

Figure 15:
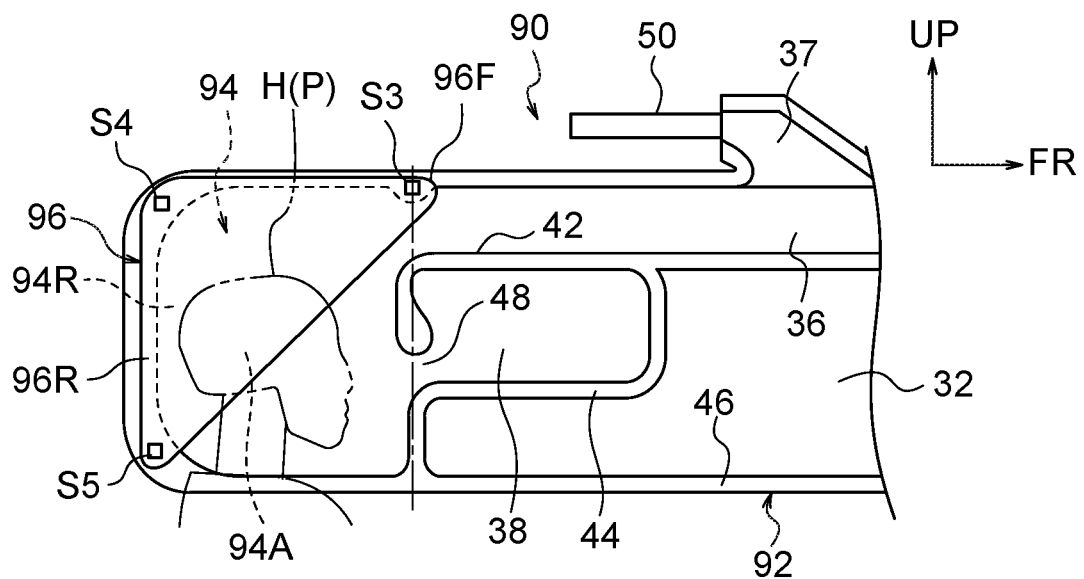
FIG. 15 is a side view illustrating a first modified example of a curtain airbag according to the fourth exemplary embodiment.
Figure 16:
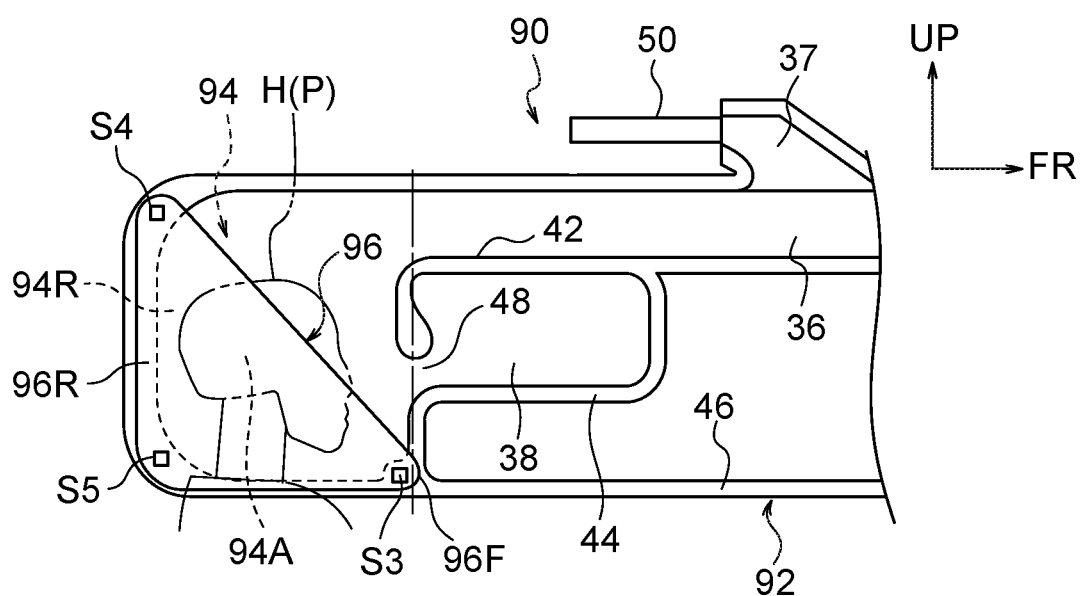
FIG. 16 is a side view illustrating a second modified example of a curtain airbag according to the fourth exemplary embodiment.

Although the fourth exemplary embodiment is configured such that the front end portion 96F of the outer tether 96 is stitched (anchored) to the rear end portion of the non-inflating portion 42, the present disclosure is not limited thereto. For example, as in a first modified example illustrated in FIG. 15, configuration may be such that the front end portion 96F of the outer tether 96 is anchored to an upper end portion of the outer periphery non-inflating portion 46, and as in a second modified example illustrated in FIG. 16, configuration may be such that the front end portion 96F of the outer tether 96 is anchored to the lower end portion of the outer periphery non-inflating portion 46.

Figure 17:
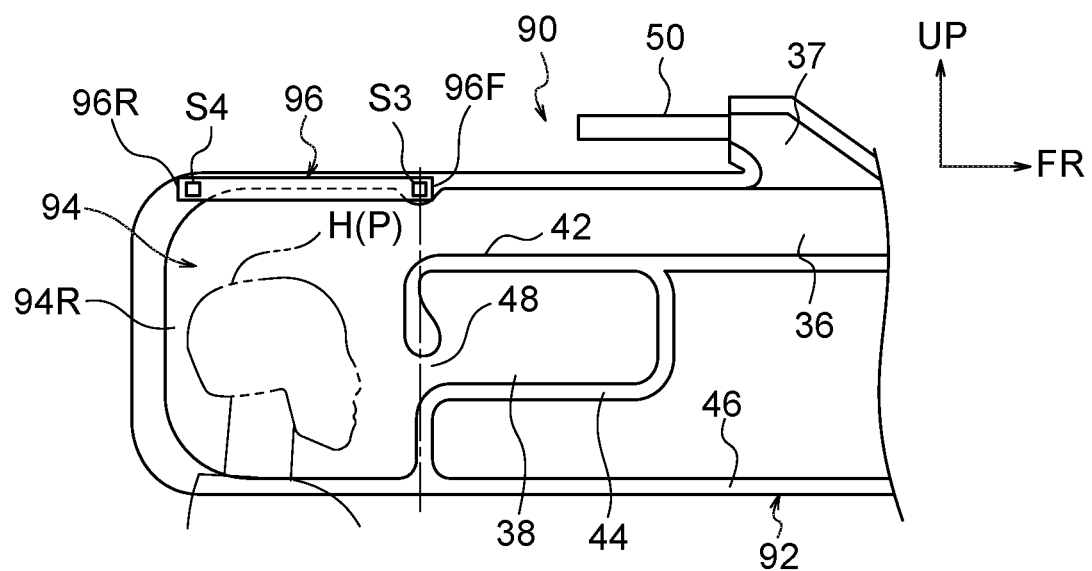
FIG. 17 is side view illustrating a third modified example of a curtain airbag according to the fourth exemplary embodiment.

In addition, although the fourth exemplary embodiment is configured such that the outer tether 96 is formed having a substantially triangular shape, the shape of the outer tether 96 may be modified as appropriate. For example, as in a third modified example illustrated in FIG. 17, configuration may be such that the outer tether 96 is formed having an elongated strip shape. In the third modified example, the front end portion 96F of the outer tether 96 is anchored to the upper end portion of the outer periphery non-inflating portion 46 at the front end portion of the rear seat chamber 94, and the rear end portion 96R of the outer tether 96 is anchored to the upper end portion of the outer periphery non-inflating portion 46 at the rear end side of the rear seat chamber 94. The first modified example to the third modified example exhibit basically the same operation and advantageous effects as the fourth exemplary embodiment.

Further, in each of the exemplary embodiments above, explanation has been given regarding a case in which the vehicle curtain airbag device 10, 70, 80, or 90 is applied to a sedan type automobile (vehicle) 12. However, there is no limitation thereto, and a vehicle curtain airbag device according to the present disclosure may be applied to a hatchback type vehicle or a vehicle with three-row seating. In such a case, the rearmost seat in the vehicle is the rear seat according to the present disclosure.

Various other modifications may be implemented within a range not departing from the spirit of the present disclosure. Obviously, the scope of rights encompassed by the present disclosure is not limited to the above exemplary embodiments.

What is claimed is:

1. A vehicle curtain airbag device comprising:
a front seat chamber configured to inflate and deploy between a head of a front seat occupant and a vehicle cabin side section, and
a rear seat chamber configured to inflate and deploy between a head of a rear seat occupant and the vehicle cabin side section, the rear seat chamber including a restraint face that opposes the head of the rear seat occupant in a vehicle width direction and is angled or curved toward a vehicle width direction outer side, on progression toward a vehicle front side, in a fully inflated and deployed state, wherein the rear seat chamber is formed in a shape in which a vehicle width direction inflation width at a location to the vehicle rear side of the center of gravity of the head of the rear seat occupant is thicker than a vehicle width direction inflation width at a location to the vehicle front side of the center of gravity, in the fully inflated and deployed state.

2. The vehicle curtain airbag device of claim 1, wherein:
the rear seat chamber is formed by joining together respective outer peripheral edge portions of a pair of side-face cloths that are arranged side-by-side in the vehicle width direction, in the fully inflated and deployed state, and of a rear-face cloth provided between rear edge portions of the pair of side-face cloths.

3. The vehicle curtain airbag device of claim 1, wherein:
the rear seat chamber includes a pair of side-face portions that are arranged side-by-side in the vehicle width direction, in the fully inflated and deployed state;
an inner tether that links the pair of side-face portions together is provided inside the rear seat chamber; and
the inner tether is formed in a shape in which a vehicle width direction dimension of the inner tether increases on progression toward the vehicle rear side in the fully inflated and deployed state.

4. The vehicle curtain airbag device of claim 3, wherein:
elongated-strip-shaped cloths are stitched into a rectangular loop shape to form the inner tether.

5. The vehicle curtain airbag device of claim 1, wherein:
a rear end portion of the rear seat chamber inflates and deploys in the vehicle width direction between a headrest of a rear seat and a vehicle body side section.

6. A vehicle curtain airbag device comprising:
a rear seat chamber configured to inflate and deploy between a head of a rear seat occupant and a vehicle cabin side section, the rear seat chamber including a restraint face that opposes the head in a vehicle width direction and is angled or curved toward a vehicle width direction outer side, on progression toward a vehicle front side, in a fully inflated and deployed state, wherein the rear seat chamber is formed in a shape in which a vehicle width direction inflation width at a location to the vehicle rear side of the center of gravity of the head is thicker than a vehicle width direction inflation width at a location to the vehicle front side of the center of gravity, in the fully inflated and deployed state, and an outer tether that is overlaid on the vehicle width direction inner side of the rear seat chamber and spans between respective front and rear end portions of the rear seat chamber, in the fully inflated and deployed state;

wherein in a non-inflated state of the rear seat chamber, the outer tether is set with a front-rear direction dimension shorter than the front-rear direction dimension of the rear seat chamber at the location where the outer tether is overlaid on the rear seat chamber.

7. A vehicle curtain airbag device comprising:

a rear seat chamber configured to inflate and deploy between a head of a rear seat occupant and a vehicle cabin side section, the rear seat chamber including a restraint face that opposes the head in a vehicle width direction and is angled or curved toward a vehicle width direction outer side, on progression toward a vehicle front side, in a fully inflated and deployed state, wherein the rear seat chamber is formed in a shape in which a vehicle width direction inflation width at a location to the vehicle rear side of the center of gravity of the head is thicker than a vehicle width direction inflation width at a location to the vehicle front side of the center of gravity, in the fully inflated and deployed state, an outer tether that is overlaid on the vehicle width direction inner side of the rear seat chamber and spans between respective front and rear end portions of the rear seat chamber, in the fully inflated and deployed state, and a cloth similar to the cloth of the curtain airbag is cut out into a substantially triangular shape to form the outer tether;

wherein in a non-inflated state of the rear seat chamber, the outer tether is set with a front-rear direction dimension shorter than the front-rear direction dimension of the rear seat chamber at the location where the outer tether is overlaid on the rear seat chamber.

* * * * *